April 16, 1968     V. G. CARLSON     3,377,714
CONTOUR LEVEL

Filed Oct. 8, 1965                                                  2 Sheets-Sheet 1

Victor G. Carlson
INVENTOR.

BY *Clarence A. O'Brien*
*and Harvey B. Jacobson*
Attorneys

April 16, 1968 V. G. CARLSON 3,377,714
CONTOUR LEVEL

Filed Oct. 8, 1965 2 Sheets-Sheet 2

Victor G. Carlson
INVENTOR.

BY Clarence A. O'Brien
and Harvey B. Jacobson
Attorneys

United States Patent Office 3,377,714
Patented Apr. 16, 1968

3,377,714
CONTOUR LEVEL
Victor G. Carlson, R.R. 2, Cherokee, Iowa 51012
Filed Oct. 8, 1965, Ser. No. 493,965
3 Claims. (Cl. 33—206)

ABSTRACT OF THE DISCLOSURE

A grade indicator including an axially mounted float immersed in a liquid contained within a housing. A cam rod is attached to the float which is received by a cam follower, the latter being attached to a rotating shaft oriented perpendicular to the float axis of rotation. A pointer is attached to the cam follower shaft thereby effecting a translation of rotational motion from the float. Finally, a dial is provided on a housing wall in front of the pointer for an indication of the angular displacement of the housing with respect to the float, this being a measure of the grade traversed by the indicator.

The present invention relates to new and useful improvements in contour levels of the type normally provided on farm vehicles for use in maintaining contour lines during farming operations.

As a contour level, it is a general object of the invention to provide a device which will enable contour plowing, and other related operations, without the necessity of preliminarily laying out the contour lines, thereby saving many hours of the farmer's time while also assuring properly laid out contour lines.

A more particular object of the instant invention is for the provision of a contour level which is adapted to immediately and exactly record any ground level variations so as to allow for a rapid correction thereof.

Further, it is contemplated that the contour level be so constructed as to avoid any undesirable vibration of either the indicator pointer or the ground level responsive member, in this instance, a pivotally mounted float.

In addition, the level itself is to be so orientated so as to provide for a direct viewing of the level indicating dial.

Furthermore, it is an object of the instant invention to provide for a contour level wherein the apparatus receiving housing is mounted for leveling adjustment in a simplified manner from the exterior thereof.

Basically, the contour level of the instant invention includes an upright housing defining a fluid-tight chamber which receives a vertically orientated float pivotally mounted at its lower end about a transverse shaft. The float carries an elongated cam rod which is in turn engaged within and resiliently retained by a cam follower mounted upon a rotatable shaft orientated perpendicularly of the first-mentioned shaft, this second shaft mounting an indicator or indicating pointer thereon. The pointer is positioned completely within the housing adjacent the forward wall thereof whereby the movement of the pointer is dampened by the contained fluid so as to eliminate any tendency for the pointer to vibrate. Finally, the entire housing is mounted on an adjusting base for effecting a leveling thereof, the housing itself being provided with a rearwardly inclined forward wall so as to facilitate the reading of the indicating dial.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
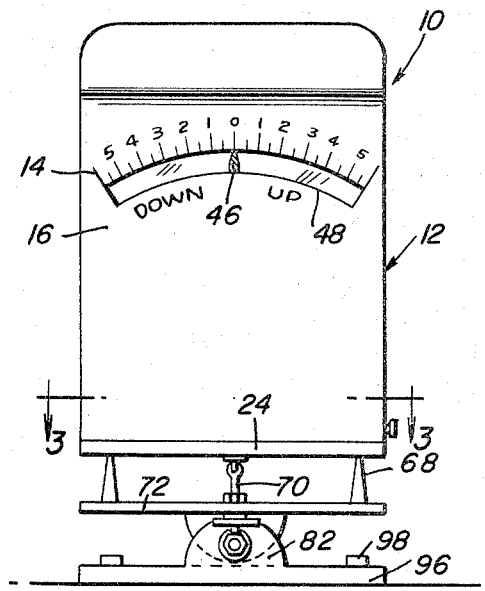
FIGURE 1 is a front elevational view of the contour level of the instant invention.
Figure 2:
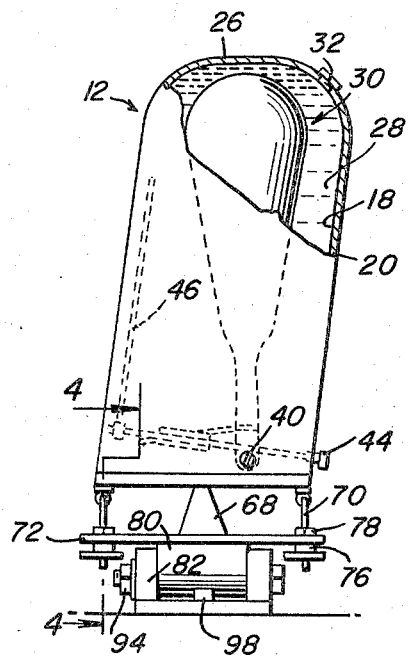
FIGURE 2 is a side elevational view of the level with a portion broken away for purposes of illustration.

Referring now more specifically to the drawings, reference numeral 10 is used to generally designate the contour level comprising the instant invention. This level 10 includes an enlarged relatively wide housing 12 inclined slightly to the vertical so as to facilitate the reading of the dial 14 defined on the forward wall 16. In addition to the forward wall 16, the housing 12, in defining an internal watertight chamber 18, also includes a similarly inclined rear wall 20 paralleling the front wall 16, two parallel side walls 22, a flat horizontally orientated bottom 24, and a front to rear arching top or top wall 26. The internal chamber 18 formed by the housing walls is to be completely filled with a suitable liquid 28 capable of floating an internally positioned float 30, the position of which will be responsive to the ground surface contours. In order to enable a filling of the housing 12, a suitable plug closed aperture 32 is provided therein adjacent the top 26. Incidentally, if deemed necessary, a small air bubble can be provided within the chamber 18 so as to accommodate any expansion of the liquid 28.

Figure 3:
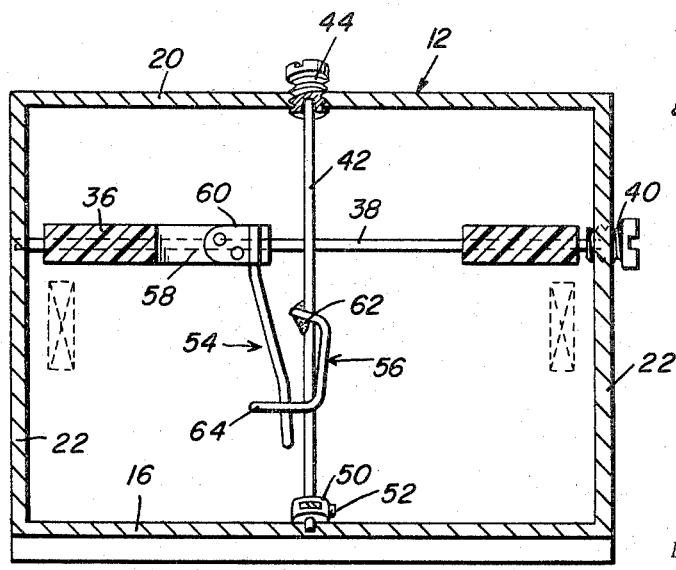
FIGURE 3 is an enlarged transverse cross-sectional view taken substantially on the plane of the section line 3—3 in FIGURE 1.
Figure 7:
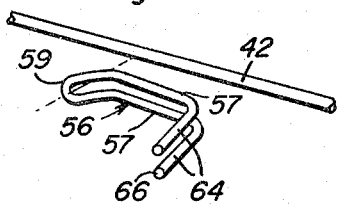
FIGURE 7 is a perspective view of the cam follower exploded away from an adjoining portion of the follower mounting shaft.

The float 30 includes an enlarged hollow relatively wide generally bulbous upper portion 34 which tapers downwardly to a solid bifurcated lower end or base 36. The lower portions of the base furcations are fixedly mounted to an elongated shaft 38 which extends between the furcations and beyond the outer sides thereof for rotational engagement within the opposed side walls 22 of the housing 12. As will be appreciated from FIGURE 3, one end of the rod-like shaft 38 seats within a bearing recess in one of the walls 22 while the other end of the shaft 38 seats within the inner end of an adjusting plug 40 threaded within the opposed side wall 22 in a manner whereby an adjustment of the rotational freedom of the shaft 38 may be effected.

A second elongated shaft 42 is orientated perpendicularly to the shaft 38 and has the opposite ends thereof rotatably engaged in the same manner as shaft 38 within a bearing recess in the front wall 16 and an adjusting plug 44 in the rear wall 20. The shaft 42, located slightly above the shaft 38 and inclined so as to engage the walls 16 and 18 at right angles thereto, extends substantially centrally across the housing 12. The indicator or indicating pointer 46, cooperating with the dial 14 through an arcuate transparent window 48, consists of an elongated straight flat bar paralleling the front wall 16 in inwardly spaced relation thereto. The mounting of the pointer 46 on the rod 42 for rotation therewith is to be effected by an annular collar 50 on the lower end of the pointer which slidably receives the rod 42 therethrough and which is in turn fixedly locked to the rod 42 in any adjusted position by means of a suitable set-screw 52 threaded through the collar 50 and into clamping engagement with the portion of the rod 42 received within the collar. It will be appreciated that by locating the indicator 46 completely within the fluid containing chamber 18, the fluid 28 itself will act so as to dampen and substantially prevent any vibration of the indicator, thereby ensuring a steadier and more accurate reading.

Figure 4:
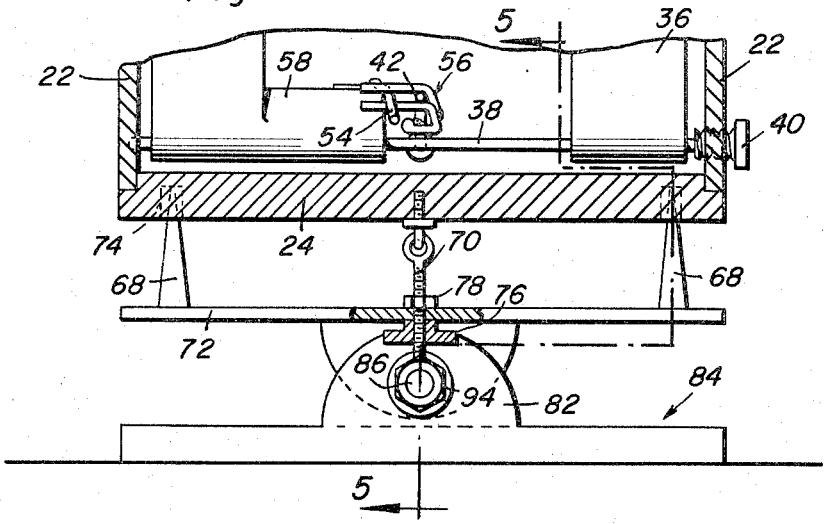
FIGURE 4 is an enlarged partial cross-sectional view taken substantially on the plane passing along line 4—4 in FIGURE 2.
Figure 5:
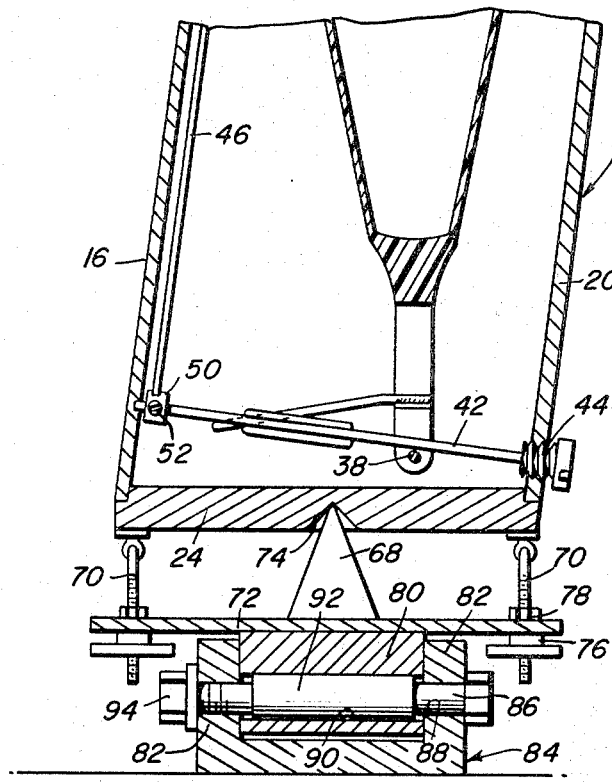
FIGURE 5 is a partial cross-sectional view taken substantially on a plane passing along the line 5—5 in FIGURE 4.
Figure 6:
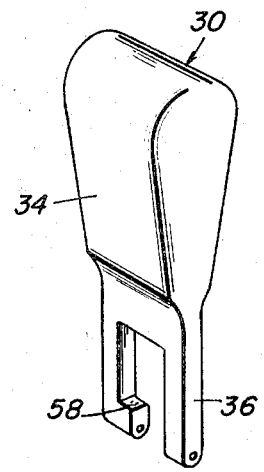
FIGURE 6 is a reduced perspective view of the float itself.

The registering of the variations in ground level on the dial 14 by the pointer 46, these variations being sensed by the float 30 which changes positioning relative to the housing 12 accordingly, is effected through a camming arrangement utilizing an elongated cam rod 54 and a cam follower 56. The cam rod 54 is secured to an inwardly projecting shoulder 58 on one of the furcations of the float base 36 through an enlarged laterally directed mounting ear 60 which is fastened to the top surface of shoulder 58. The cam rod 54 projects forward from its fixed engagement with the float base 36 toward the front wall 16 in a manner so as to generally parallel the shaft 42, the rod 54 having a slight longitudinal offset therein so as to bring the forward portion thereof juxtaposed the shaft 42 and at a slight downward angle relative thereto as can be best seen in FIGURE 5. The cam follower 56 consists of an elongated rod folded so as to define a pair of parallel rod portions 57 interconnected by a smooth bight portion 59. These spaced rod-like portions 57 are in turn folded, as a unit, into a general U-shape and received over the shaft 42 in a manner which will be best appreciated from viewing FIGURES 3 and 4. Basically, the rounded bight portion 59 is welded, as at 62, to the shaft 42 on the side thereof corresponding to the camming rod 54, from there, the rod-like portions 57, one above the shaft 42 and one below the shaft 42, extending across the shaft 42 and then forwardly generally parallel the shaft 42 juxtaposed the opposite side thereof. Next, both rod-like portions 57 return across the shaft 42, one above and one below, and define a pair of elongated spaced parallel cam rod receiving portions 64 which terminate in spaced generally coplanar ends 66. It is contemplated that the rod from which the cam follower 56 is formed possess a slight degree of resiliency which, enhanced by the manner in which the follower 56 is secured solely at the bight portion 59 thereof, enables a relatively firm resilient gripping of the cam rod 54 between the cam receiving portions 64. This is deemed particularly significant in that as the cam rod 54 raises and lowers in response to movement of the float 30, a change in the angular position of the cam rod 54 will result. The resilient nature of the cam follower 56 enables an accommodation of this variation in the angular position of the cam rod 54 so as to maintain both the upper and lower cam receiving portions 64 in intimate contact with the rod 54 during movement thereof, this in turn providing for an instantaneous response of the indicator 46 to any movement of the float 30. The provision of a rigid cam follower, as for example by providing a rigid interconnection between the ends 66, would necessitate the provision of a space between the rod-receiving portions 64 sufficient so as to accommodate the variations in the angle of the cam rod 54, thereby resulting in a lag between movement of the float 30 and the indicator 46 which in turn will effect the accuracy of the entire instrument. On the contrary, by providing for a constant intimate contact between the cam rod 54 and the rod-receiving portions 64, through the resilient mounting thereof, any movement of the float 30 is instantaneously reflected in the corresponding movement of the indicating pointer 46, thus providing a highly accurate instrument. As indicated supra, this accuracy is further effected through the use of the contained fluid 28 as a vibration-preventing medium for both the float 30 and the indicator pointer 46.

The housing 12 of the contour level 10 is to have the vertical orientation thereof adjusted, from front to rear, about a pair of laterally spaced centrally located peaked pedestals 68 through front and rear adjusting bolts 70. This adjustment is to be effected relative to a flat plate 72 from which the pivot point defining pedestals 68 project, the upper end of these pyramidal pedestals being received within enlarged pyramidal recesses 74 in the bottom 24 of the housing 12. The adjusting bolts 70 are pivotally engaged with the bottom 24 of the housing 12 at central points below the front and rear walls 16 and 20 by interlocked eyes, one integrally formed with the top of each bolt 70 and the other fixed to the bottom wall 24 and depending therefrom adjacent each bolt 70. The major portion of the shank of each bolt 70 is threaded and projects through a hole in the plate 72 with the actual adjustment being effected through an enlarged adjusting nut 76 threaded on the corresponding bolt 70 below the plate 72, and a lock nut 78 threaded on the bolt 70 above the plate 72. Accordingly, it will be appreciated that when the adjustment of the level of the housing 12 is to be made, both lock nuts 78 are backed off, and the adjusting nuts 76, having enlarged gripping handles thereon, are simultaneously adjusted so as to effect a pivoting of the housing from front to rear about the pedestals 68, after which the lock nuts 78 are then brought into locking engagement with the plate 72.

A further leveling adjustment of the level 10 is effected perpendicularly to the aforedescribed adjustment. This adjustment is achieved through the provision of a centrally located elongated semicylindrical block 80 fixed to the plate 72 and depending therefrom, this block 80 extending generally from front to rear relative to housing 12. The block 80 is received between front and rear vertically projecting ears 82 on the mounting base 84 and is rotatably supported therebetween by an elongated clamping bolt 86 projecting through aligned holes 88 in the ears 82 and an elongated passage 90 through the block 80. If desired, a smooth rotational adjustment of the block 80 can be achieved through the provision of an internal sleeve 92 about the bolt 86. The clearance between the block 80 and the spaced ears 82 is just sufficient so as to allow for a rotation of the block 80 between the ears 82 when the clamping nut 94 on bolt 86 is loose. Upon being properly positioned, the nut 94 is tightened so as to effect a tensioning of the bolt 86 and a clamping movement of the ears 82 against the block 80, thereby fixing the adjusted position of the housing 12. Accordingly, it will be appreciated that a side to side adjustment or leveling of the housing 12, so as to accommodate it to the particular situation encountered, can be quickly effected by loosening the nut 84 and manually rotating the housing 12 from left right or right to left and subsequently re-tightening the nut 94. By the same token, the front or rear leveling will be effected as described above through the bolt 70 and adjusting nuts 76. Incidentally, it will be noted that the base 84 includes a pair of oppositely directed horizontal flanges 96 which receive bolts 98 therethrough for mounting of the contour level 10 on the particular vehicle or tractor.

From the foregoing, it will be appreciated that a novel contour level has been defined, this level providing for an accurate and instantaneous indication of the variations in the level of the ground. The accuracy of the level is achieved through the utilization of a float-type ground level sensing member which, through a constantly engaged cam rod and follower, controls the movement of an indicating pointer which in turn is also positioned within the liquid containing chamber for the float, thereby eliminating any tendency for the pointer to vibrate, so as to adversely effect the reading of the dial. Incidentally, the reading of the dial is substantially facilitated by the inclination of the front wall of the housing. Further, any adjustment of the contour level so as to properly align the pointer at the zero mark on the dial can be simply and quickly effected through the external means provided below the housing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A contour level comprising an upright housing defining a fluid-tight chamber adapted to contain a float buoying fluid, said housing including opposed front and rear wall portions and opposed side wall portions, a vertically oriented float located within said housing, means pivotally mounting the float at the lower end thereof for movement of the float between the opposed front and rear wall portions of the housing about an axis extending transversely of said housing between the opposed side wall portions thereof, a calibrated dial defined in said front wall portion, an indicating pointer located within said housing immediately behind said front wall portion and operatively associated with the dial, means mounting the pointer for movement in a plane paralleling the front wall portion and perpendicular to the plane of movement of the float, and means operatively engaging the float with the pointer for translating pivotal movement of the float between the front and rear wall portions into movement of the pointer perpendicular thereto, said means mounting the pointer including an elongated rotatably mounted shaft extending between the front and rear wall portions, and means fixing said pointer to said shaft and for rotation therewith, said means operatively engaging the float with the pointer comprising a cam means fixed to the float and a cam follower means fixed to said elongated shaft, said cam follower means positioned for operative engagement with said cam means and possessing a degree of resiliency for resiliently retaining the cam in substantial contact therewith throughout a major portion of the movement thereof, said cam follower flexing so as to accommodate variations in the angular relation of the cam means thereto during the movement of the float, said housing including a base wall, a plurality of recesses in the base wall of said housing, a corresponding number of peaked pedestals, the base of each said pedestal affixed to a reference plate, the apex of each said pedestal received by one of said recesses, a plurality of threaded fasteners, one end of each said fastener rotatably engaging the base wall of said housing, an intermediate point on each of said fasteners engaging an associated threaded member which in turn is affixed to said reference plate so that variation of the distance between said fastener ends and said intermediate points effectuate a preselecter angular displacement of said housing about said pedestals and fixedly secures said housing to said reference plate in the angularly displaced position.

2. The construction of claim 1 together with a mounting base containing a central recess therein, a block affixed to the underside of said reference plate and received within said recess for rotational displacement therein, means for releasably clamping said mounting base and said block together thereby fixedly orientating the angular disposition of said housing.

3. The construction of claim 2 together with means for adjusting the freedom of movement of said float about an associated axis.

References Cited

UNITED STATES PATENTS

| | | | |
|---|---|---|---|
| 1,061,638 | 5/1913 | Scott et al. | 33—214 |
| 1,360,102 | 11/1920 | Ericson | 33—215.3 |
| 1,459,500 | 6/1923 | Cady | 33—169 |
| 1,706,201 | 3/1929 | Drexler | 33—204.1 |
| 2,595,109 | 4/1952 | Steady | 33—215.1 X |
| 2,624,954 | 1/1953 | Watkins | 33—207 X |
| 2,683,314 | 7/1954 | Schneider | 33—215.3 |
| 2,788,578 | 4/1957 | Digiancinto | 33—219 X |

LEONARD FORMAN *Primary Examiner.*

L. V. ANDERSON, *Assistant Examiner.*